(12) United States Patent
Neuhaus et al.

(10) Patent No.: US 6,542,890 B1
(45) Date of Patent: Apr. 1, 2003

(54) REALTIME DATA SORTING AND REDUCTION

(75) Inventors: Werner Neuhaus, Elchingen (DE); Markus Barthel, Neu-Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/531,638

(22) Filed: Mar. 21, 2000

(30) Foreign Application Priority Data

Nov. 25, 1999 (DE) .......................................... 199 56 625

(51) Int. Cl.[7] .......................... G06F 17/30; G06F 12/00
(52) U.S. Cl. ............................ 707/7; 707/100; 711/154; 711/117
(58) Field of Search ..................... 707/7, 100; 711/154, 711/117

(56) References Cited

U.S. PATENT DOCUMENTS

| 5,168,567 A | * 12/1992 | Everson et al. ............... 707/7 |
| 5,704,057 A | * 12/1997 | Cho ............................... 707/7 |
| 5,924,091 A | * 7/1999 | Burkhard ....................... 707/7 |
| 6,058,209 A | * 5/2000 | Vaidyanathan et al. ..... 382/203 |

FOREIGN PATENT DOCUMENTS

EP 1 103 822 A * 5/2001 ............ G01S/7/295

OTHER PUBLICATIONS

Cobbin, A Tutorial on the Simple Simulation Environment, Proceedings of the 1996 Winter Simulation Conference, pp. 168–177.*

Marvin L. Belcher and Josh T. Nessmith, "Pulse Radar", pp. 1043–1057, CRC Press LLC, 1997.

* cited by examiner

Primary Examiner—Frantz Coby
(74) Attorney, Agent, or Firm—Kenyon & Kenyon

(57) ABSTRACT

A method of filtering data includes creating a cell control block array so as to form a histogram, the histogram having a plurality of cell control blocks, and each of the plurality of cell control blocks corresponding to a corresponding cell classifiable as core or non-core and used or unused. Each of the plurality of cell control blocks has a cell counter, a first link word pointing to a start of a data output chain if the corresponding cell is used and core, and a second link word pointing to a related core cell if the corresponding cell is used and non-core. The histogram is formed as a function of at least one parameter including a first parameter and has a first lower limit and a first upper limit for the first parameter. Input data is received as a function of the at least one parameter so as to form a plurality of event descriptor blocks, the at least one parameter including the first parameter. The method then determines whether each of the plurality of event descriptor blocks corresponds to one of the plurality of cell control blocks within the histogram, and, if so, determines whether the corresponding cell of the one cell control block is used or unused and if the corresponding cell is unused, changes a classification of the corresponding cell in the cell control block from unused to used. The input data is then output to an output data array as a function of the first and second link words.

20 Claims, 12 Drawing Sheets

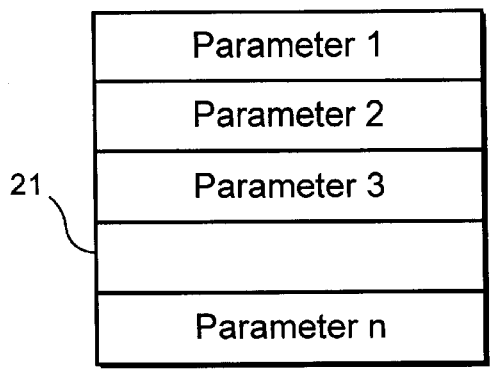
F I G. 3
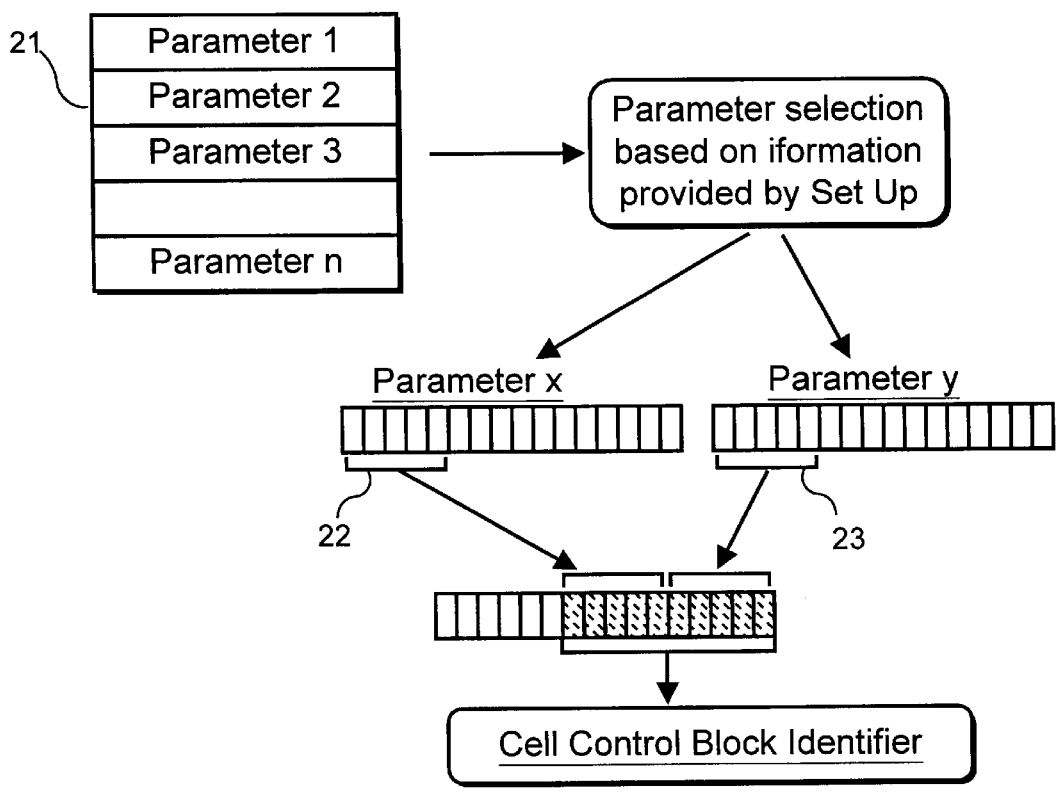
F I G. 4

REALTIME DATA SORTING AND REDUCTION

FIELD OF THE INVENTION

The present invention relates generally to data processing systems and methods, and more particularly to a method for online presorting and reduction of data to be processed.

RELATED TECHNOLOGY

Data processing systems typically receive information that is subsequently processed. For example, receiver systems often receive pulse data from a broad range of frequencies received in different directions.

As described in "Pulse Radar" by Marvin L. Belcher and Josh T. Nessmith (CRC Press LLC, 1997), which is hereby incorporated by reference herein, the digital processing in a radar system often includes signal processing and data processing. Signal data received by an antenna is sent in digital form to a signal processor, where the signal data can be filtered using a fast Fourier transform (FFT) to reduce computational requirements. The output of the signal processor can be characterized in terms of range gates and Doppler filters corresponding to the range and Doppler resolution, respectively. The output data is then sent to a radar data processor, typically a general purpose computer with a realtime operating system. These data processors can range from microcomputers to mainframes, depending upon the requirements of the radar system.

The radar data filtering using the fast Fourier transform however is applied in the same way to a stream of input data, which is not presorted or prefiltered.

Other data processing systems reduce or compress data using compression schemes. Input audio and video signals can be converted to digital signals which then are compressed, for example, using a coding scheme based on, for example, special waveforms or Fourier transforms. These coding or compression schemes thus reduce the amount of digital data corresponding to the audio and video signals, so that the data can be transmitted more quickly over a certain bandwidth and adequately reproduced at an output.

These coding systems as well are applied in the same way to a stream input data and do not intelligently presort the data or reduce redundant data.

SUMMARY OF THE INVENTION

It is advantageous to presort data an to reduce redundant data so that subsequent computational requirements can be reduced. This presorting and reduction is especially advantageous when operating in a high dense signal environment.

The present invention provides a method of sorting and reducing data in which a so-called cell control block array is created so as to form a histogram. The histogram thus has a plurality of cell control blocks, each of which corresponds to a corresponding cell classifiable as core or non-core and used or unused. Each of the plurality of cell control blocks has a cell counter, with the cell counter being incremented if the corresponding cell is identified by an input event. Each of the plurality of cell control blocks also has a first link word for pointing to a start of a data output chain if the corresponding cell is used and core, and each of the plurality of cell control blocks has a second link word for pointing to a related core cell if the corresponding cell is used and non-core. The histogram is a function of at least one parameter including a first parameter and has a first lower limit and a first upper limit for the first parameter. The input data is received as a function of the at least one parameter so as to form a plurality of event descriptor blocks, with the at least one parameter including the first parameter. The method then determines whether each of the plurality of event descriptor blocks corresponds to one of the plurality of cell control blocks within the histogram, and, if so, determines whether the corresponding cell of the one cell control block is used or unused. If the corresponding cell is unused, a classification of the corresponding cell in the cell control block is changed from unused to used. The input data of the plurality of event descriptor blocks is then output to an output data array as a function of the first and second link words.

Thus, the input data is sorted into data output chains formed around core cells. This sorting can be especially advantageous in reducing the computational requirements for detection systems such as radar warning equipment, electronic measurement equipment and electronic intelligence equipment, as events with similar parameter values can be grouped.

The method may provide that at least one parameter further includes a second parameter. The desired parameters advantageously can be selected during an initialization period.

The method may also provide that the outputting of the input data occurs after a certain time period, a so-called dwell period. This time period can be predefined, and can range from milliseconds to hours or days, depending on the application. For example, if the method of the present invention is used in a detection system, presorting of data related to detection of astronomical events advantageously may have very long dwell periods, while some radar applications advantageously may have very short dwell periods.

During an initialization period before the dwell period, the plurality of cell control blocks advantageously are classified as unused.

During the dwell period, an event may occur which corresponds to a first cell control block of the cell control blocks. This first cell control block is surrounded in the histogram by surrounding cell control blocks of the plurality of cell control blocks. The method of the present invention then may include that if the first control block cell is determined as unused, it is further determined if at least one of the surrounding cell control blocks is used. If all of the surrounding cell control blocks are unused, the first cell control block designates its corresponding cell as core. However, if one or more of the surrounding cell control blocks is used, the first cell control block is linked to the core cell of the first used surrounding cell.

If the first cell control block identified by an event is determined as used, it is further determined whether the first cell control block corresponds to a core cell or a non-core cell. If the first cell control block is a core cell and a data limit set by the method of the present invention is exceeded, then the event is counted; no further action is taken and the next input data are read. If the first cell control block correspond to a non-core cell, a link is obtained for the first cell control block to indicate the related core cell.

In this way, the events are sorted so that core and related cells are grouped so they can be output as data chains with similar parameter characteristics. Data reduction is performed through the limits.

The histogram may be n-dimensional and with n being one or more. Preferably, the histogram has at least two dimensions, as at least two parameters are desirable for most applications in sorting and grouping the data.

The histogram thus may be divided between the first lower limit and the first upper limit into 2k columns, k being a number of bits of the first parameter used in the determining whether each of the plurality of event descriptor blocks corresponds to one of the plurality of control block cells.

The method of the present invention advantageously can be used in a detection system, such as a system using radar warning equipment, electronic support measurement equipment, or electronic intelligence equipment. The parameters of the method can thus include a propagated frequency of signals or waves measured by the detection system and a measured direction of arrival of the signals or waves.

The present invention thus provides for reduction of redundant or unnecessary data in high signal density environments of detection systems. In electromagnetic environments in which signal density may exceed several million events per second, this reduction in required processing needs can eliminate or reduce overloads in subsequent data processing equipment. This is especially so if the equipment is covering a broad instantaneous RF and angle range, and even more so if high powered RF emitters are being used.

The input data in the form of event descriptor blocks of the present invention may be received from a parameter or signal measurement facility, such as a pulse extractor. The event descriptor block is a vector containing at least one parameter. In a preferred embodiment, the event descriptor block is a vector containing at least two parameters, such as for example the frequency of the signal received and the angle or measured direction of the signal received. Other parameters which could be included in the event descriptor block include amplitude of the signal, the time of arrival, and the width of the pulse in which the signal is received.

The event descriptor blocks may be stored before sorting in a FIFO memory which operates as a buffer.

The method of the present invention can reside in a storage medium such as a memory as a set of instructions capable of being executed by a processor.

BRIEF DESCRIPTION OF THE DRAWINGS

The present invention will be further described with reference to the following drawings, in which:

FIG. 3 shows an event descriptor block;

FIG. 4 shows a flow chart of the cell control block identification step of the present method;

DETAILED DESCRIPTION

Figure 1:
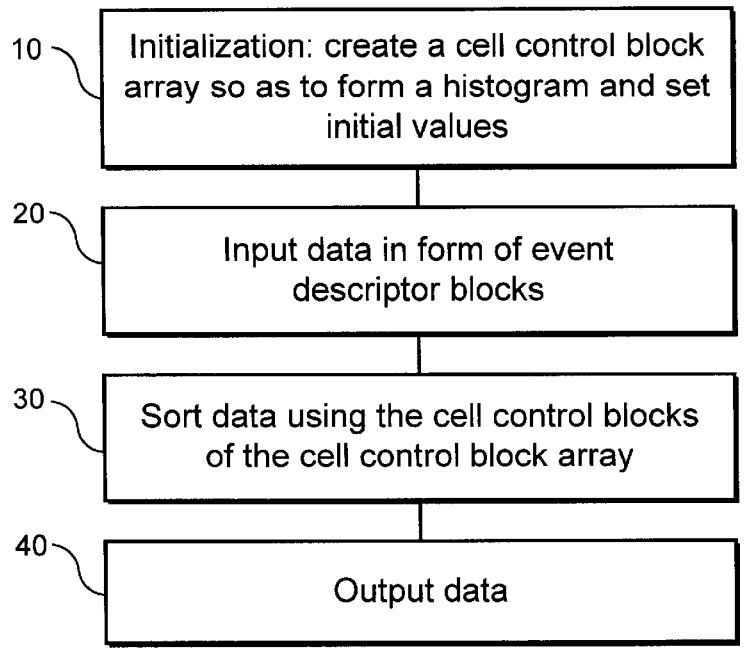
FIG. 1 shows a generalized flow chart of the method of the present invention.

FIG. 1 shows a general flow chart of the present invention, which will be described in more detail by reference to the other figures. First, during an initialization period 10, a cell control block array is formed so as to create a histogram which is subsequently used to sort input data using cell control blocks. These cell control blocks each contain data sorting and reducing information for a specific location, i.e. a corresponding cell which covers a value range of at least one parameter. The data are then input during an input step 20, and then sorted based on the cell control blocks in an sorting step 30 so that data chains with similar parameter characteristics are formed. The sorted data then are output in an output step 40.

Figure 2:
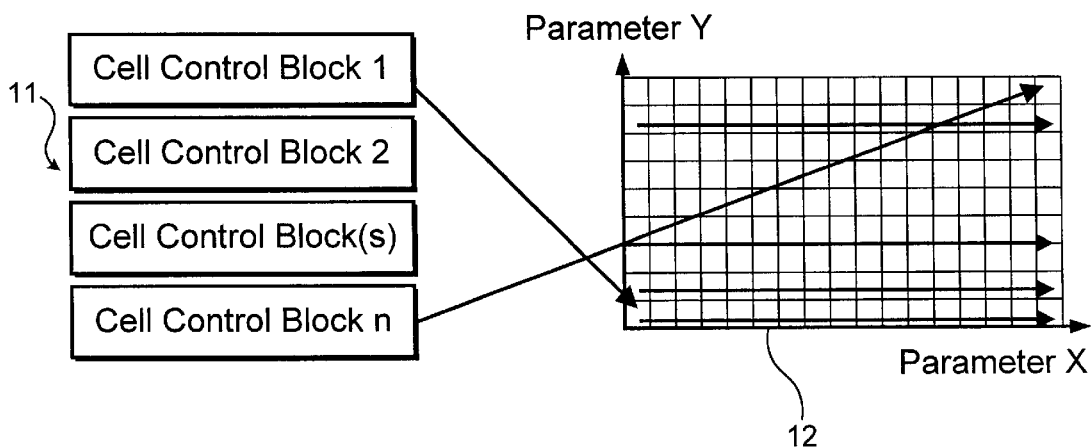
FIG. 2 shows the cell control blocks forming the histogram of the present method.

FIG. 2 describes in further detail the forming of the histogram during initialization period 10. During the initialization period 10, an array 11 of cell control blocks 1, 2, ... n is created so as to form a histogram 12. The histogram 12 has, for example, 2 dimensions representing a first parameter X and a second parameter Y. However, the histogram may have one or more than two dimensions. The selection of the parameters and the size of the cells controlled by the cell control block can vary depending on the application.

For example, a two dimensional histogram based on frequency and measured direction of a received signal can be set up for a range of frequencies and a range of measured direction angles. The frequency range thus has a lower limit and an upper limit and the angle range also has a lower limit and an upper limit, for example zero to 360 degrees. The frequency range can be divided N times and the angle range M times, so that an N by M histogram is set up, forming N*M cell control blocks. For example, M could be 32 and the angle range 360 degrees, so that each cell covers 11.25 degrees in the angle direction. Other parameters could include amplitude, time of arrival and pulse width and the histogram could have one, three or more dimensions as well.

In the sorting step 30 of FIG. 1, the cell control blocks of the histogram are used to sort and reduce the input data as will be described in more detail. The input data are first received in the form of event descriptor blocks in the inputting step 20. The structure of an event descriptor block 21 is shown in FIG. 3. The event descriptor block 21 is an array of data, with the array having at least one parameter. For example, the event descriptor block may be a two-dimensional array containing a frequency and measured direction of a received radar signal.

During the dwell period a stream of data is received, for example from a pulse extractor, as a function of the parameters and sent for sorting in the form of event descriptor blocks. The data preferably are stored in a FIFO memory.

The event descriptor blocks are then identified with a corresponding cell control block of the histogram during a cell control block identifier step of sorting step 30 of FIG. 1. As shown in FIG. 4, parameters x and y, respectively, of the event descriptor block 21 are selected from the event descriptor block. These parameters used from the event descriptor block 21 are specified during initialization and correspond to parameters of the histogram set up during the initialization. The defined most significant bits 22,23 of the event descriptor block parameters x and y, respectively, are then used to identify the corresponding cell control block in the histogram and record an event.

Figure 5:
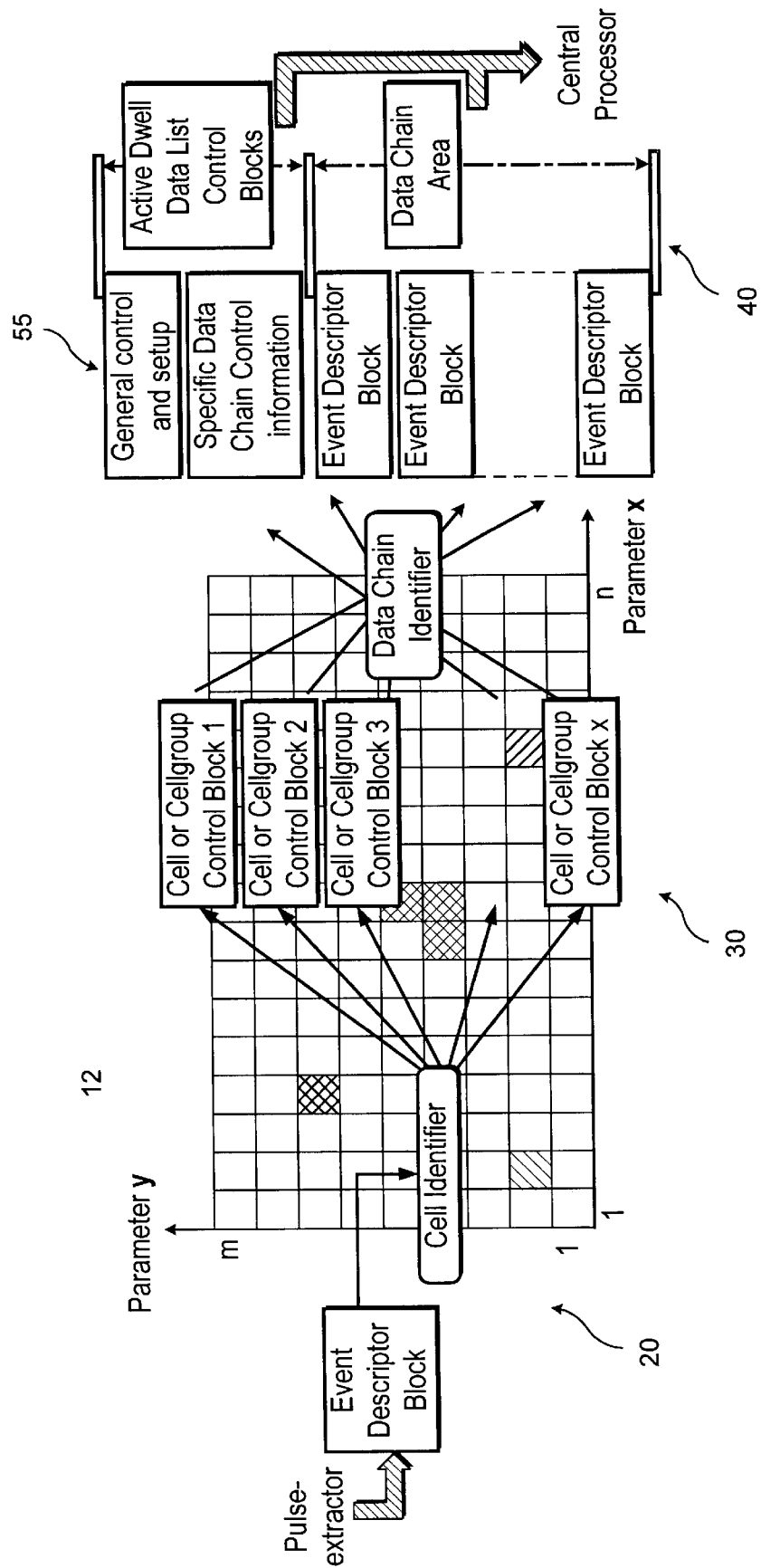
FIG. 5 depicts the method of the present invention in generalized form.

FIG. 5 shows an overview of the input step 20, the sorting and filtering step 30, and the output step 40. Each of the event descriptor blocks are identified with the cell control blocks of the histogram 12. The cell control blocks have a link to an output data array 55, so that only certain event descriptor blocks are then output as a function of specific data chain control information.

Figure 6:
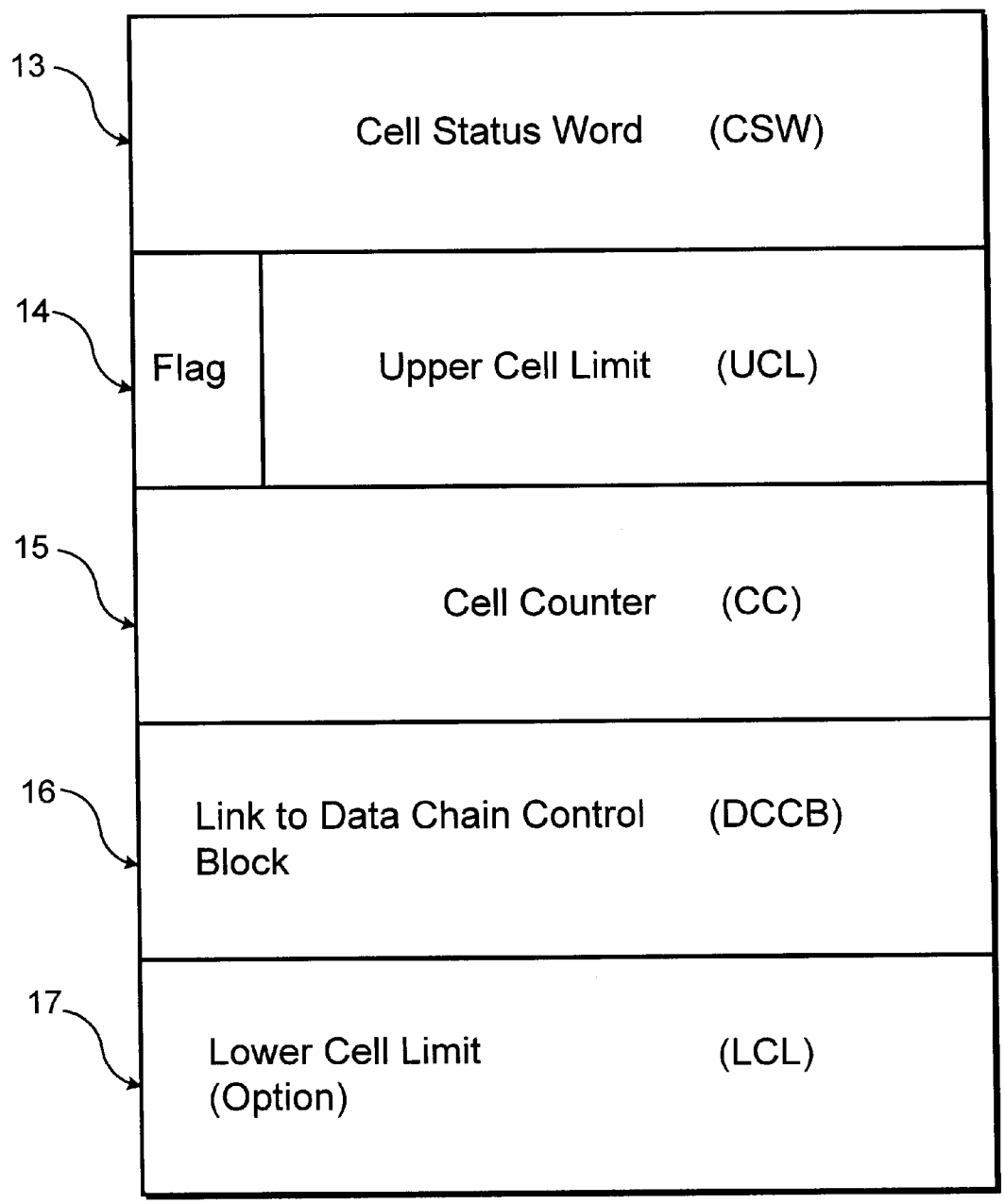
FIG. 6 shows the format of a cell control block.

The details of the cell control blocks 1, 2,3, . . . n are shown in FIG. 6. Each cell control block may contain the following information: a cell status word 13, an upper cell limit 14 with an operational flag, a cell counter 15, a link to a data chain control block 16 and a lower cell limit 17. The cell status word 13 is a multibit word which identifies whether a cell controlled by the cell control block is used or unused, i.e. whether input data corresponding to that cell location in the histogram has previously been identified during the dwell period. At the start of the dwell period, the cell status word is set to zero, which indicates that the cells have not yet been used or identified. Then, if a cell is identified during the cell control block identification step, the cell status word of the corresponding cell control block is given a non-zero value, either −1 or a positive value. If the cell is a core cell, as will be described in further detail, the cell status word equals −1. If the cell is a non-core cell, the cell status word is a positive value representing a link to a core cell. The link value can, for example, be the cell control block number of the core cell.

The upper cell limit 14 is used to filter the input data by providing a limit on the number of events for the corresponding cell controlled by the cell control block. If the limit is exceeded, the event is counted but no further processing is performed for the event descriptor block and the next event descriptor block is processed. The upper cell limit 14 is only used when the flag equals 1. If the flag equals zero, the chain limit 72 is used.

The cell counter 15 counts the number of events for the corresponding cell within a dwell period. Zero signifies that no event has occurred. The link 16 to the data chain control block provides a link to the output data, i.e. to a data chain control block in the output data array. As a function of this link the data are read out in the outputting step, and therefore this link provides a sorting function for the method of the present invention.

A lower cell limit 17 is also optionally available. If the number of events during a dwell does not exceed this number, the events are not output.

Figure 7:
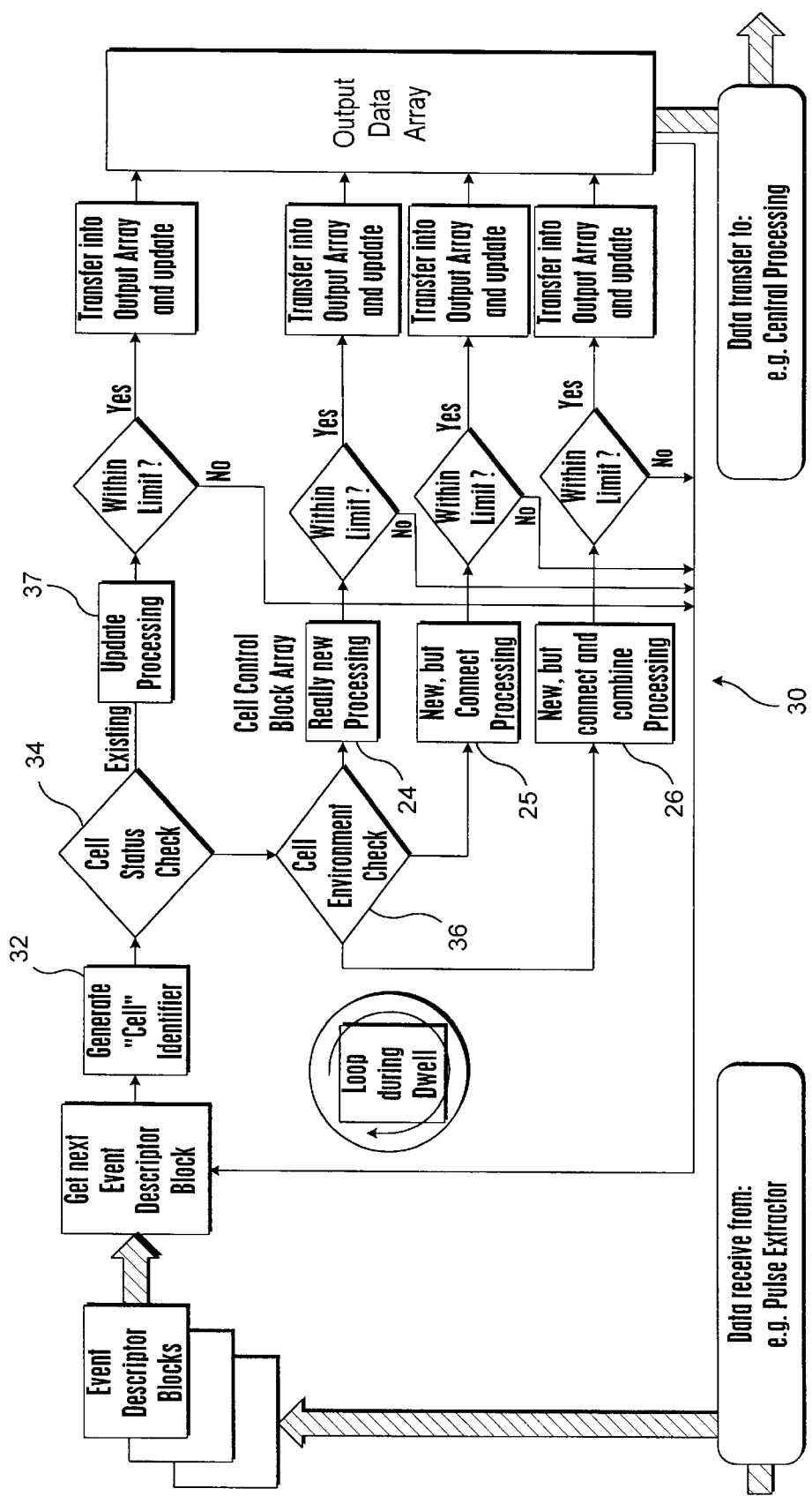
FIG. 7 shows an overall view of the method of the present invention.

FIG. 7 shows a general overview of the method of the present invention including the sorting step 30. The data is received from the event descriptor blocks and the cell control block identification step 32 is run to see if the event corresponds to a cell control block in the histogram. If so, the cell status word 13 (see FIG. 6) in that cell control block is checked at step 34 to determine if the cell is unused or used.

Figure 8:
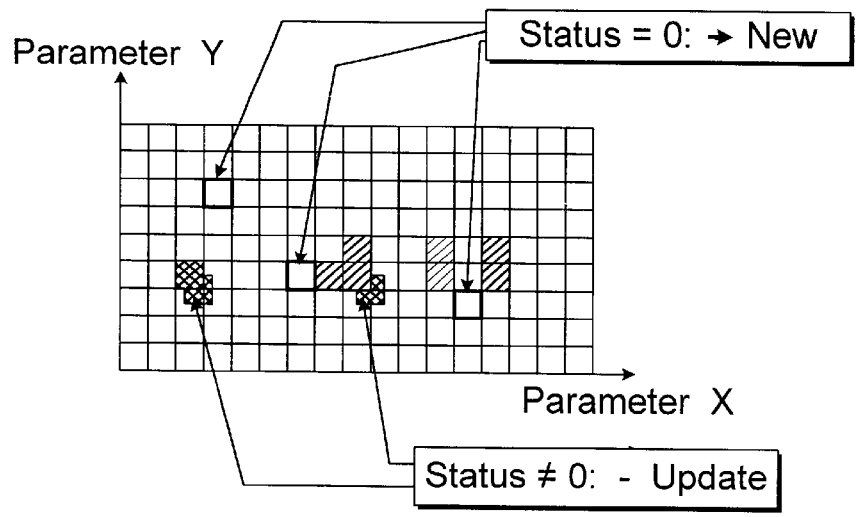
FIG. 8 depicts the determination of whether a cell is used, i.e. new, or unused, i.e. not equal to zero.

FIG. 8 shows a depiction of the cell status check process of step 34. Each cell is either used or unused, which is determined in step 34 by checking if the cell status word of a cell control block is zero or nonzero.

Figure 9:
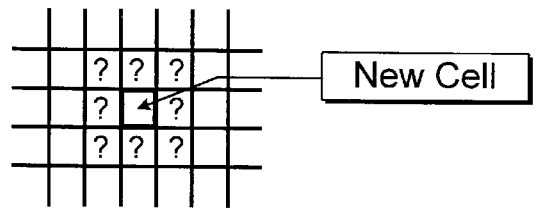
FIG. 9 depicts the determination of the status of surrounding cells of a new cell.

If the cell is unused, i.e. new, the cell environment is checked in step 36, i.e. the cell control blocks surrounding the identified cell are checked, as depicted in FIG. 9.

Figure 10:
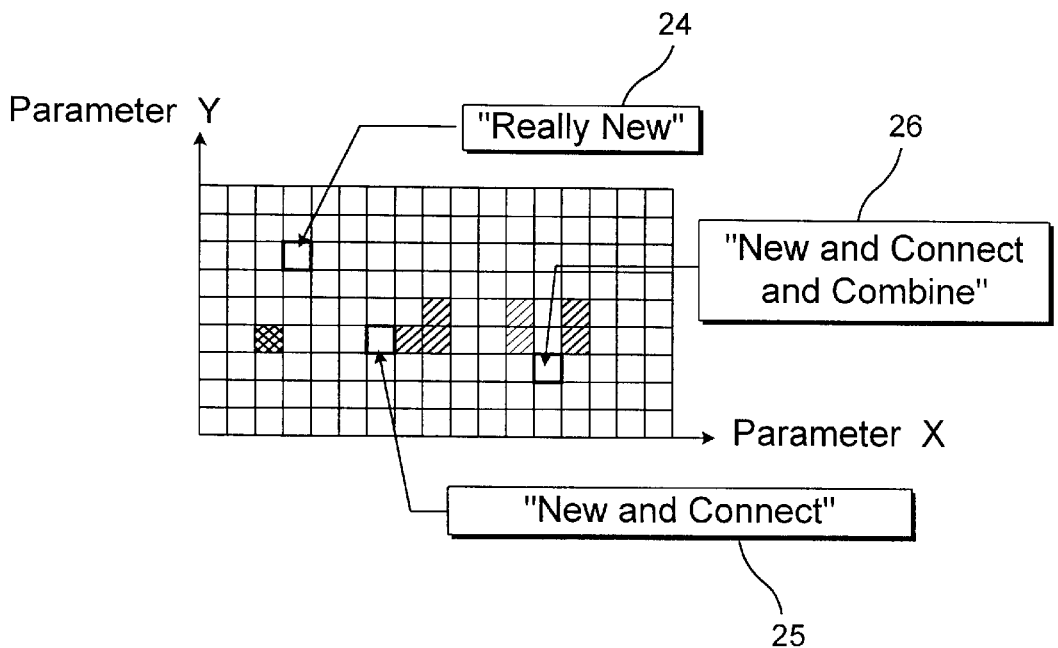
FIG. 10 shows the determination of choosing one of three sub-methods for sorting new, i.e. unused, cells.

As shown in FIGS. 7 and 10, the sorting method includes three sub-methods when the identified cell control block is determined unused or new. These sub-methods include a really new sub-method 24 to determine if the identified cell control block is really new, i.e. that no environment cells are used, and a new and connect sub-method 25 to determine if the identified cell control block is new and connectable with an already used cell control block in the histogram, i.e. that one of the environment cells is used. The third sub-method is a new and connect and combine sub-method 26 for determining if the identified cell control block is new and connectable with more than one independent cell control block groups, i.e. able to combine two independent cell control block groups.

If no environment cells are used, then the really new sub-method will be run. The really new sub-method is described in FIG. 11. First, in step 101, the cell status word is set to −1 from zero. Then the link to a next free chain entry in a data output header is retrieved in step 102 from a data output header and the chain control entry link is stored in the link to the data chain control block in the cell control block. The cell counter is increased by one in step 103, as is the overall data storage counter in the output data header in step 104. The chain counter in the output data chain control words is then increased by one in step 105. The upper cell limit is then retrieved from the cell control block in step 106 and stored in a chain limit word of an output data chain control block. Then depending on the status of the flag in the identified cell control block, in step 107 either the upper cell limit (flag=0) or the chain limit (flag=1) is used. If the event is outside upper cell limit or the chain limit, or outside of the overall data storage limit of the output data header, no further steps are taken and the next data entry is retrieved, as shown in step 108. If within the limits, the link to a next free data entry is retrieved from the output data header in step 109, which is then updated. The link to the start of the chain is updated in step 110, as is the link to the current end of chain in step 111. The event descriptor block data finally is then transferred to a new data output entry in step 112. A new data entry is then processed.

Figure 12:
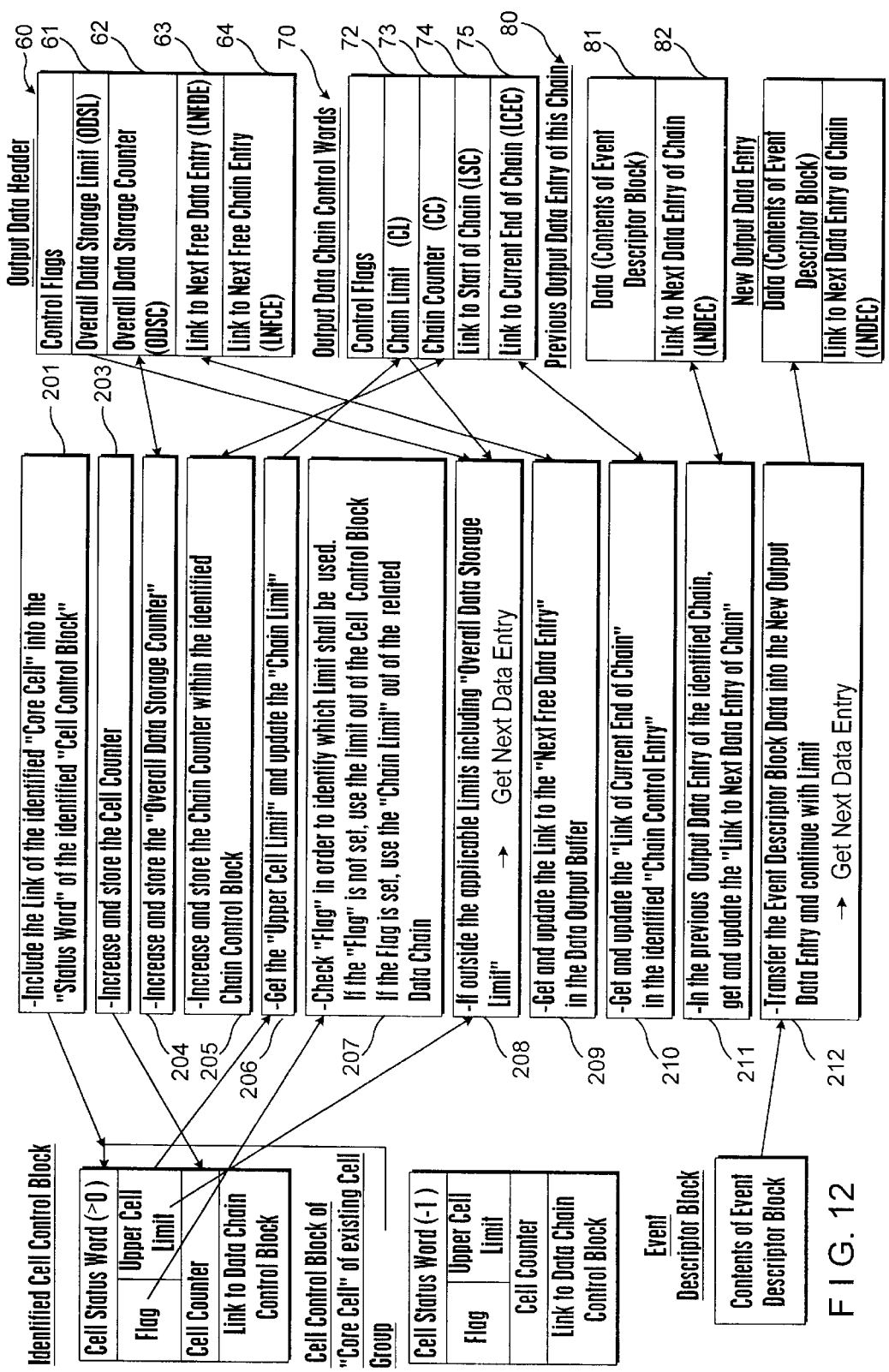
FIG. 12 shows a flowchart of the new and connect sub-method of FIG. 9.

The new and connect sub-method is shown in FIG. 12 and is run when one cell control block group is found to be adjacent to the identified cell control block. The core cell of the adjacent cell group (identified by a −1 in the cell status word) is determined. The address of this core cell is then stored in the cell status word of the identified cell control block in step 201. The next steps 203, 204, 205, 206, 207, 208 and 209 proceed as with the really new sub-method steps 103, 104, 105, 106, 107, 108, and 109 respectively. The link to the end of the current chain for that core cell group is then updated in step 210, the link to the next data entry of the chain is updated in the previous output data entry in step 211, and a new output data entry is formed in step 212.

Figure 11:
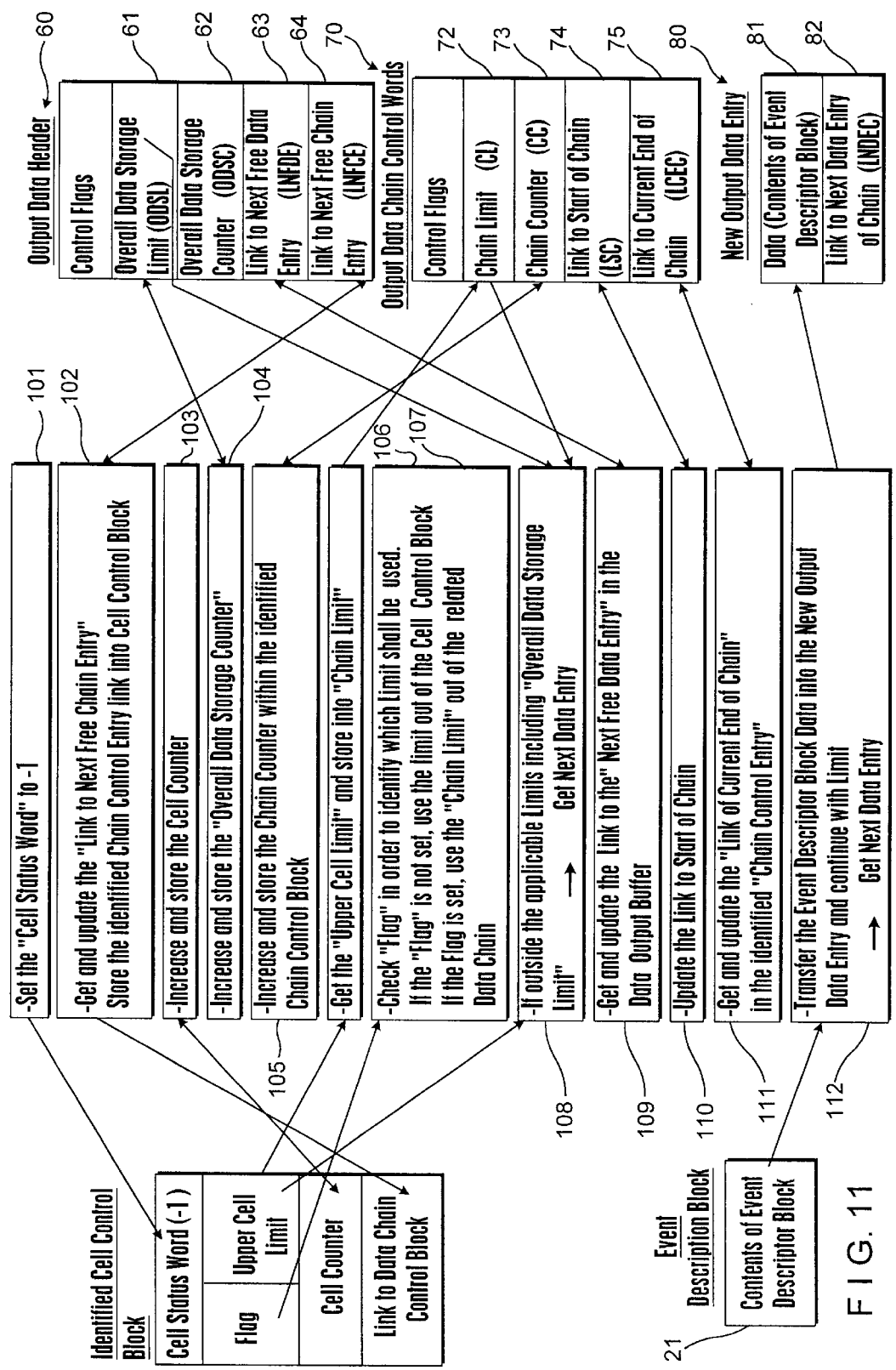
FIG. 11 shows a flowchart of the really new sub-method of FIG. 9.

With reference to FIG. 11 and FIG. 12, the outputting of the data can be explained in more detail. Each new core cell starts a new chain, with a link to the start of the chain being provided in step 110 in the output data chain control word 70 for the chain at location 74. This is a link to the first data entry in the chain. Thus the chain starts with a core cell and the new and connect sub-routine attaches a new data output entry to the core cell data entry so as to extend the chain.

For each new event in the chain, including the first event, the chain counter 73 is increased (see steps 105 and 205), so that the number of events in that chain are counted. A chain limit 72 provides a limit on the number of events allowed for the current chain. The link to the current end of the chain 75 provides the address of the last data entry of the chain and is continuously updated during the dwell period.

The output data header 60 shown in FIG. 11 contain general output data information for each dwell period and includes an overall data storage limit 61 which can limit (see steps 107, 207) the number of events collected during a dwell period. The overall data storage header 62 counts the number of events collected during a dwell period. The link to the next free data entry 63 provides the address of the next available free data entry and is continuously updated during the dwell. The link to the next free chain entry provides the address of the next available data chain control word entry. As new chains are formed around core cells, this entry is updated. (See step 102).

The output data entry 80 contains the data of the event descriptor block at location 81 and a link to the next data entry of the chain 82. This location remains blank until a next data entry in the chain occurs. The address of this next data entry is then entered into the link location 82.

Thus chains can be formed and output around the core cells, so that the data is sorted into groups having similar parameter characteristics.

Figure 13:
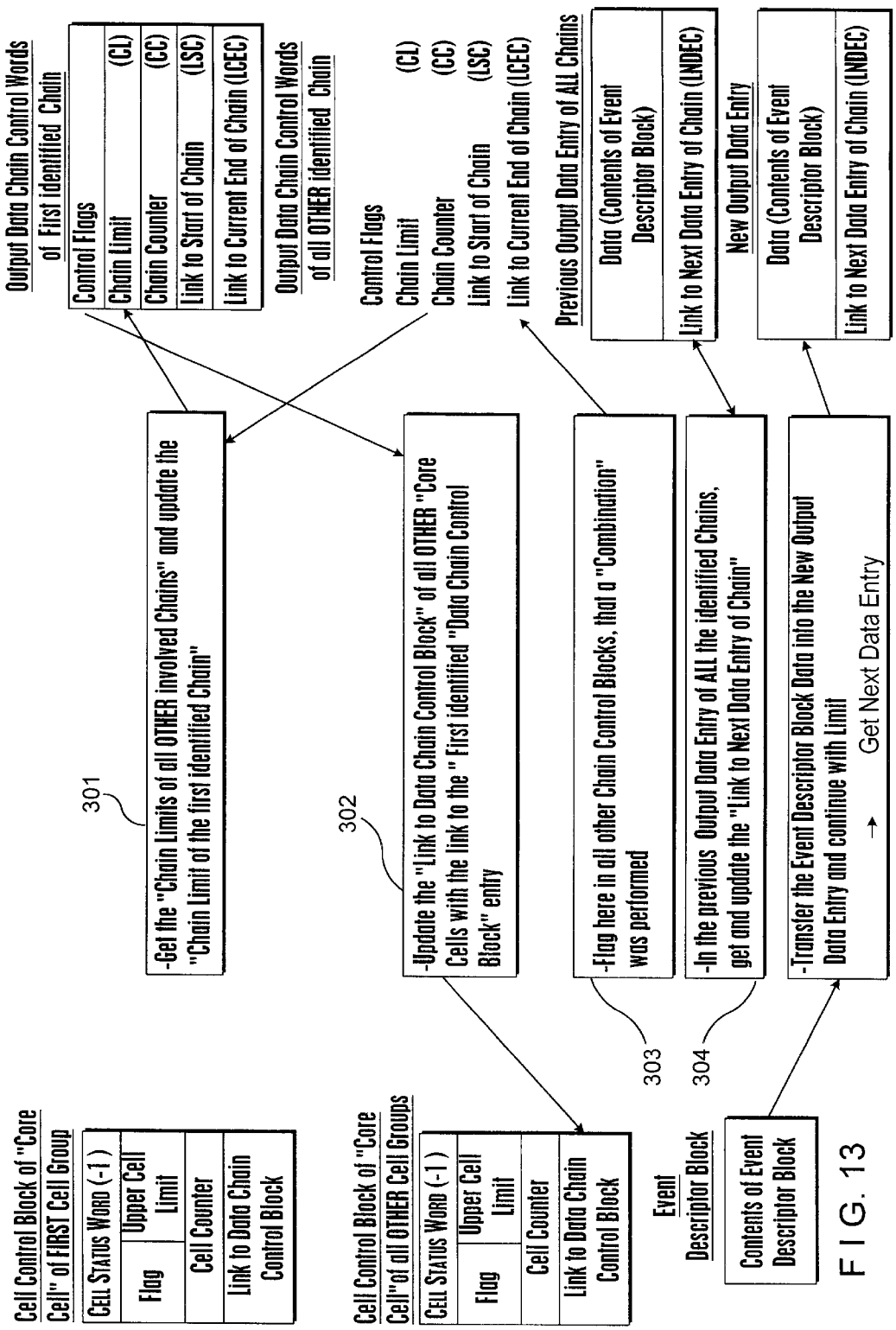
FIG. 13 shows a flowchart of the new and connect and combine sub-method of FIG. 9 to the extent it differs with the sub-method of FIG. 12.

FIG. 13 shows the new and connect and combine submethod, which is performed when at least two groups with core cells, i.e. at least one other chain is merged into are combined. As shown in FIG. 11, the new and connect and combine sub-method functions similarly to the new and combine sub-method with the following additional steps. In step 301, the chain limits of the other involved chains are added to the first identified chain. The core cells of the other chains or cell groups are linked to the first identified chain in step 302. In step 303, the link to current end of chain in the other chain control words is updated to indicate that a combination was performed. Then in step 304 the links in the previous output data entries of the first chain and the other chain are updated.

Figure 14:
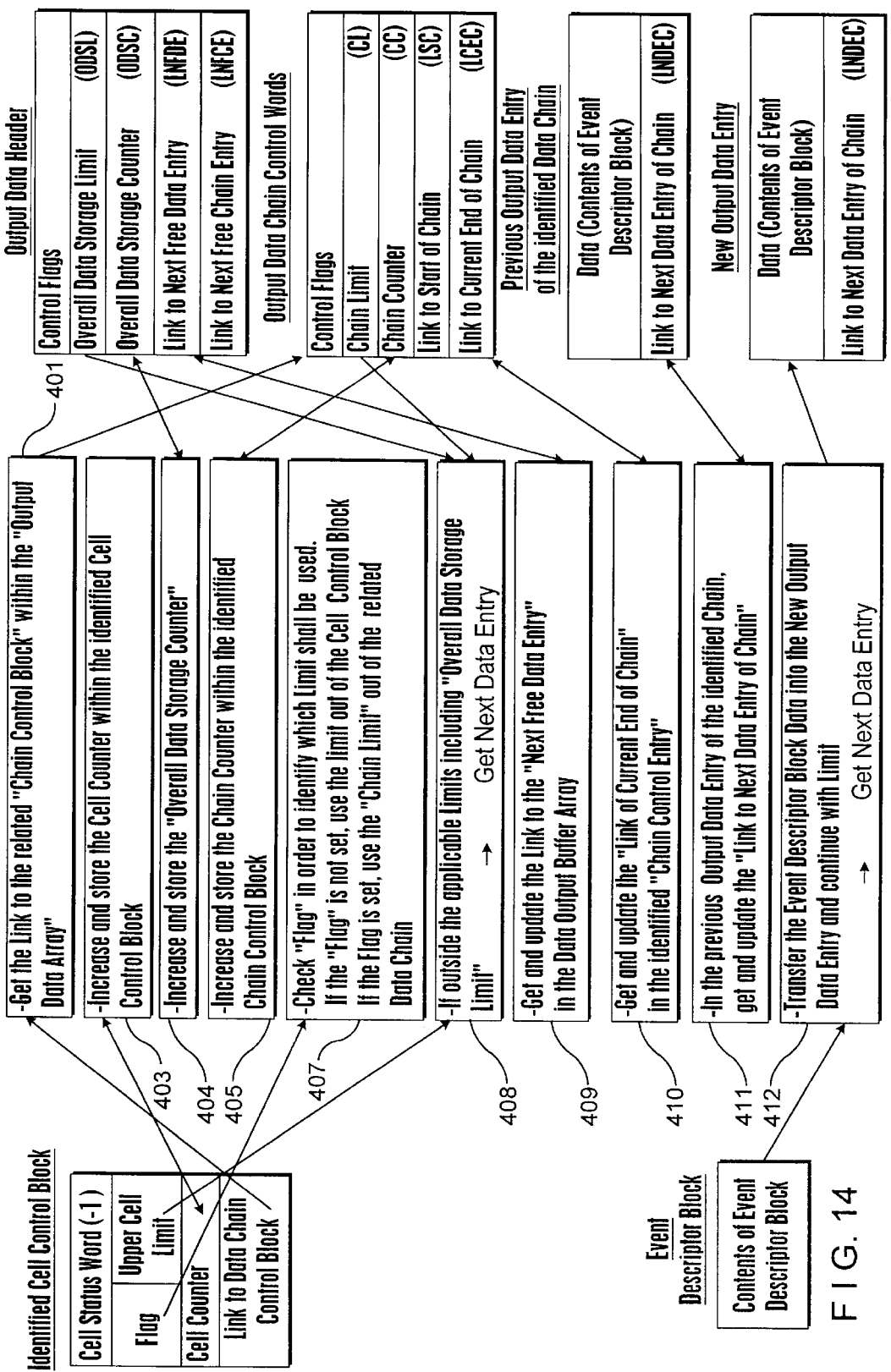
FIG. 14 shows a flowchart of the update sub-routine for a core cell.

As shown in FIG. 7, if the cell control block in the histogram identified from the input data is already used, an update processing routine is run at step 37. Two sub-routines exist: one for a core cell and the other for a noncore cell. FIG. 14 shows the update processing routine if a used core cell has been identified. In step 401, the link to the related chain control block within the output data array is retrieved, i.e. the chain control block for the chain of the core cell. The subroutine steps 403, 404, 405, 407, 408, 409, 410, 411 and 412 then follows steps 203, 204, 205, 207, 208, 209, 210, 211 and 212 as in FIG. 12. The update core cell routine in FIG. 14 however does not have a step corresponding to step 206 of FIG. 12, the chain limit is not retrieved since it has already been set.

Figure 15:
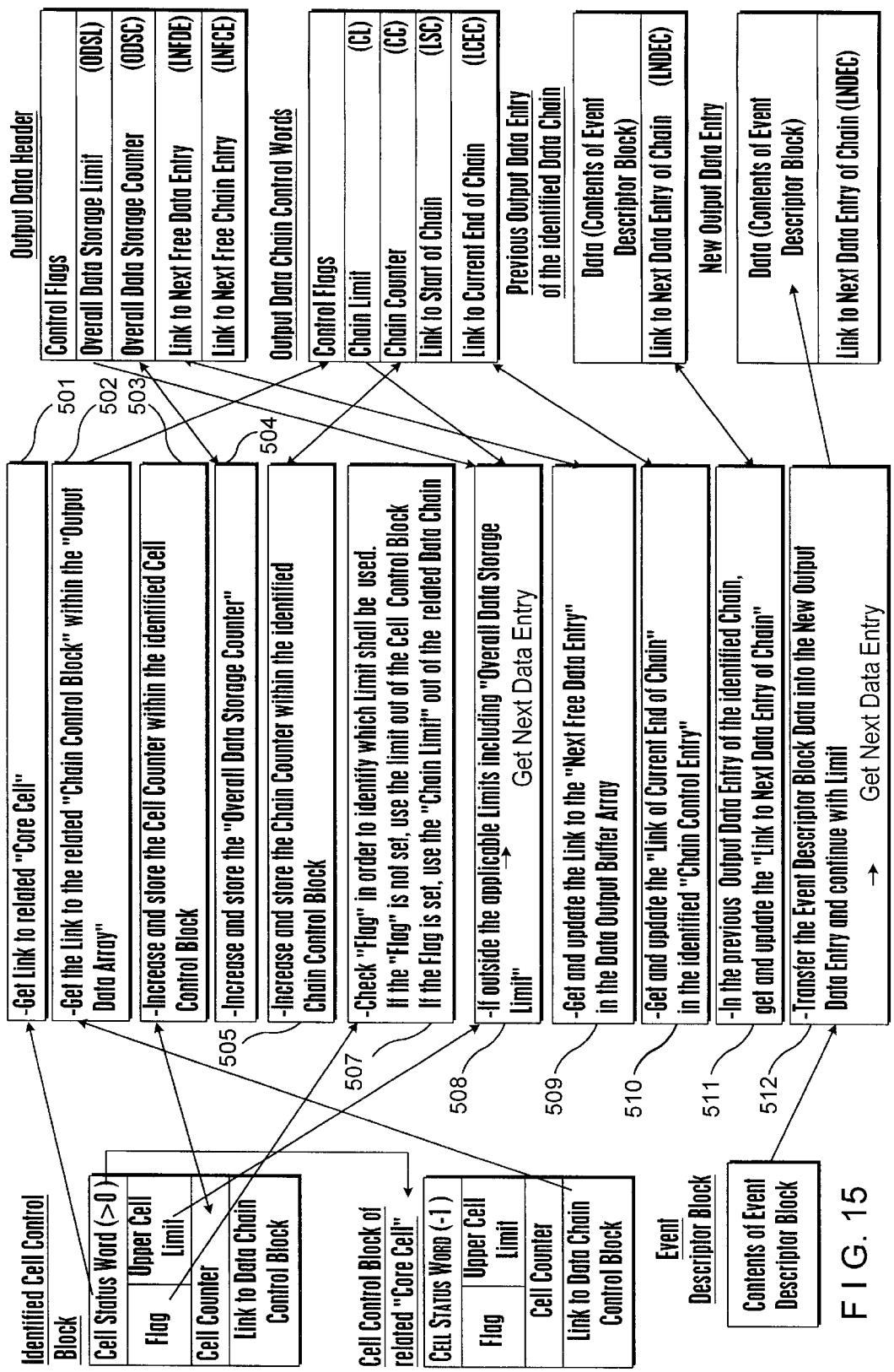
FIG. 15 shows a flowchart of the update subroutine for a noncore cell.

FIG. 15 shows the update processing routine if a used, non-core cell has been identified. First, in step 501 the cell status word is read, which provides the link to the core cell. The link to the data chain control block for the proper chain is retrieved from the core cell in step 502. The sub-routine steps 503, 504, 505, 507, 508, 509, 510, 511 and 512 then follow similarly to steps 403, 404, 405, 407, 408, 409, 410, 411 and 412 in FIG. 14.

Figure 16:
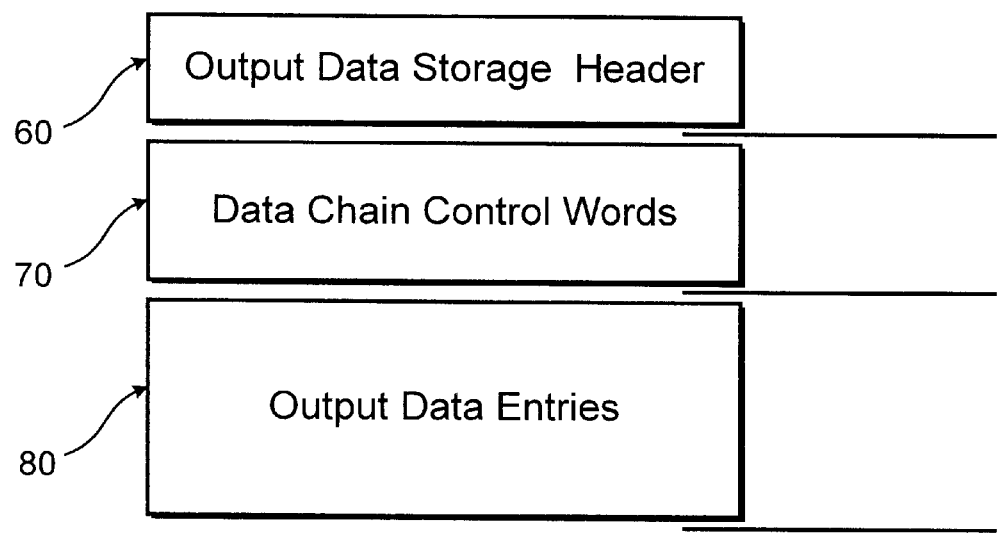
FIG. 16 shows an output data array of the present invention.

As shown in FIG. 16, the output data array is used to output data and includes an output data storage header 60, data chain control words 70 for each chain, and the output data entries 80.

After one dwell period is completed, the various chains of data are read out, so that presorted, parameter-similar groups of data can be further processed.

Before the next dwell period, the initialization occurs and is used to clean up the input FIFO memory and initialize the sorting parameters, the cell control blocks and the output data array. The clean up of the FIFO memory includes simply emptying the FIFO memory of its contents. The initialization of the sorting parameters include selecting the relevant parameters for sorting and provides the number of most significant bits (MSBs) to be used for a cell identifier calculation. The parameters to be used can be received from a central control processor. Default cell control block arrays, i.e., various prestored histograms, can also be provided.

Initialization of the output data array includes providing an input for the overall data storage limit. The number of maximum allowed events for each dwell, as well as a maximum allowed number of data chains is thus determined. In addition, fields for the link to free data and chain entries are set to zero.

What is claimed is:

1. A method of sorting data comprising:
creating a cell control block array so as to form a histogram, the histogram having a plurality of cell control blocks, each of the plurality of cell control blocks corresponding to a corresponding cell classifiable as core or non-core and used or unused, each of the plurality of cell control blocks having a cell counter for being incremented if the corresponding cell is identified by an input event, each of the plurality of cell control blocks having a first link word for pointing to a start of a data output chain if the corresponding cell is used and core, and each of the plurality of cell control blocks having a second link word for pointing to a related core cell if the corresponding cell is used and non-core, the histogram being a function of at least one parameter including a first parameter and having a first lower limit and a first upper limit for the first parameter;

receiving input data as a function of the at least one parameter so as to form a plurality of event descriptor blocks, the at least one parameter including the first parameter;

determining whether each of the plurality of event descriptor blocks corresponds to one of the plurality of cell control blocks within the histogram, and, if so, determining whether the corresponding cell of the one cell control block is used or unused and, if the corresponding cell is unused, changing a classification of the cell control block from unused to used; and outputting the input data of the plurality of event descriptor blocks to an output data array as a function of the first and second link words.

2. The method as recited in claim 1 wherein the at least one parameter further includes a second parameter.

3. The method as recited in claim 1 wherein the outputting of the input data occurs after a certain time period.

4. The method as recited in claim 1 wherein the plurality of cell control blocks are classified as unused before the determining whether each of the plurality of event descriptor blocks corresponds to one of the plurality of control block cells.

5. The method as recited in claim 1 wherein the plurality of cell control blocks includes an input event cell control block identified by a respective event descriptor block and surrounding cell control blocks surrounding the input event cell control block, and if the input event cell control block is determined unused, further comprising determining if at least one of the surrounding cell control blocks is used.

6. The method as recited in claim 5 further comprising designating the corresponding cell of the first cell control block as core if all of the surrounding cell control blocks are unused.

7. The method as recited in claim 5 further comprising linking the input event cell control block to a core cell if only one of the surrounding cells is classified as used.

8. The method as recited in claim 5 further comprising linking the input event cell control block to a core cell if at least one of the surrounding cell control blocks is classified as used.

9. The method as recited in claim 1 wherein if the one cell control block is determined used, further comprising determining whether the one cell control block is a core cell or a related cell.

10. The method as recited in claim 9 wherein if the one cell control block is a core cell, further comprising determining if a limit has been exceeded and if so counting and then discarding the input data.

11. The method as recited in claim 9 wherein if the one cell control block is a related cell, further comprising obtaining a link from the one cell control block to a related core cell.

12. The method as recited in claim 1 wherein the at least one parameter includes the first parameter and n−1 other parameters, the histogram being n-dimensional.

13. A method of sorting data comprising:

Choosing at least one parameter for sorting the data;

forming a cell control block array as a function of the at least one parameter, the cell control block array having a plurality of cell control blocks for sorting the data into output data chains having similar values of the at least one parameter, at least one of the plurality of cell control blocks having a first link word for pointing to a start of one of the data output chains; and receiving input data as a function of the at least one parameter.

14. A method of sorting data in a detection system comprising:

creating a cell control block array so as to form a histogram, the histogram having a plurality of cell control blocks, each of the plurality of cell control blocks corresponding to a corresponding cell classifiable as core or non-core and used or unused, each of the plurality of cell control blocks having a cell counter, the cell counter being incremented if the corresponding cell is identified by an input event, each of the plurality of cell control blocks having a first link word pointing to a start of a data output chain if the corresponding cell is used and core and each of the plurality of cell control blocks having a second link word pointing to a related core cell if the corresponding cell is used and non-core, the histogram being a function of at least one parameter including a first parameter and having a first lower limit and a first upper limit for the first parameter;

receiving input data as a function of the at least one parameter so as to form a plurality of event descriptor blocks, the at least one parameter including the first parameter;

determining whether each of the plurality of event descriptor blocks corresponds to one of the plurality of cell control blocks within the histogram, and, if so, determining whether the corresponding cell of the one cell control block is used or unused and if the corresponding cell is unused, changing a classification of the corresponding cell in the cell control block from unused to used; and outputting the input data of the plurality of event descriptor blocks to an output data array as a function of the first and second link words.

15. The method as recited in claim 14 wherein the first parameter is a propagated frequency of signals or waves measured by the detection system.

16. The method as recited in claim 14 wherein the at least one parameter further includes a second parameter, the first parameter being a propagated frequency of signals or waves measured by the detection system and the second parameter being a measured direction of arrival of the signals or waves measured by the detection system.

17. The method as recited in claim 16 wherein the histogram has a first angle lower limit and a first angle upper limit for the measured direction of arrival, and wherein the first lower limit is a lower frequency limit and the first upper limit is a frequency upper limit so as to form a two-dimensional histogram.

18. The method as recited in claim 16 wherein the detection system is one of radar warning equipment, electronic support measurement equipment and electronic intelligence equipment.

19. An article comprising a storage medium, the storage medium having a set of instructions, the set of instructions being capable of being executed by at least one processor to implement a method for sorting data, the set of instructions when executed comprising:

creating a cell control block array so as to form a histogram, the histogram having a plurality of cell control blocks, each of the plurality of cell control blocks corresponding to a corresponding cell classifiable as core or non-core and used or unused, each of the plurality of cell control blocks having a cell counter, the cell counter being incremented if the corresponding cell is identified by an input event, each of the plurality of cell control blocks having a first link word pointing to a start of a data output chain if the corresponding cell is used and core and each of the plurality of cell control blocks having a second link word pointing to a related core cell if the corresponding cell is used and non-core, the histogram being a function of at least one parameter including a first parameter and having a first lower limit and a first upper limit for the first parameter;

receiving input data as a function of the at least one parameter so as to form a plurality of event descriptor blocks, the at least one parameter including the first parameter;

determining whether each of the plurality of event descriptor blocks corresponds to one of the plurality of cell control blocks within the histogram, and, if so, determining whether the corresponding cell of the one cell control block is used or unused and if the corresponding cell is unused, changing a classification of the corresponding cell in the cell control block from unused to used; and outputting the input data of the plurality of event descriptor blocks to an output data array as a function of the first and second link words.

20. The article as recited in claim 19 wherein the at least one processor is a signal processor of a detection system.

* * * * *